(12) United States Patent
Gahner

(10) Patent No.: US 11,240,653 B2
(45) Date of Patent: Feb. 1, 2022

(54) MAIN UNIT, SYSTEM AND METHOD FOR AN INFOTAINMENT SYSTEM OF A VEHICLE

(71) Applicant: Audi AG, Ingolstadt (DE)

(72) Inventor: Enrico Gahner, Vohburg a.D. (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 17/049,205

(22) PCT Filed: Mar. 4, 2019

(86) PCT No.: PCT/EP2019/055258
§ 371 (c)(1),
(2) Date: Dec. 9, 2020

(87) PCT Pub. No.: WO2019/206497
PCT Pub. Date: Oct. 31, 2019

(65) Prior Publication Data
US 2021/0243582 A1   Aug. 5, 2021

(30) Foreign Application Priority Data

Apr. 25, 2018  (DE) ..................... 10 2018 206 335.4

(51) Int. Cl.
*H04W 4/80* (2018.01)
*H04W 4/40* (2018.01)
*H04W 84/12* (2009.01)

(52) U.S. Cl.
CPC ............... *H04W 4/80* (2018.02); *H04W 4/40* (2018.02); *H04W 84/12* (2013.01)

(58) Field of Classification Search
CPC .................................. H04W 4/80; H04W 4/40
See application file for complete search history.

(56) References Cited

U.S. PATENT DOCUMENTS 10,064,151 B2 * 8/2018 Yae ..................... H04B 1/3822
2012/0209611 A1   8/2012 Furuta et al.
(Continued)

FOREIGN PATENT DOCUMENTS

DE   112010005020 T5   10/2012
DE   102015224740 A1    9/2016
(Continued)

OTHER PUBLICATIONS

International Search Report and Written Opinion of the International Searching Authority directed to related International Patent Application No. PCT/EP2019/055258, dated Jun. 17, 2019, with attached English-language translation; 12 pages.
(Continued)

*Primary Examiner* — Tuan H Nguyen
(74) *Attorney, Agent, or Firm* — Sterne, Kessler, Goldstein & Fox P.L.L.C.

(57) ABSTRACT

The present disclosure relates to a head unit for an infotainment system of a vehicle. The head unit is coupled to a mobile terminal device via a Bluetooth link. The head unit is configured to exchange a digital audio signal adapted for improved audio quality during the hands-free talking, via an additional wireless link, in response to hands-free talking during a phone call with the mobile terminal device coupled via the Bluetooth link based on a hands-free profile.

17 Claims, 2 Drawing Sheets

(56) References Cited

U.S. PATENT DOCUMENTS

2012/0308022 A1* 12/2012 Ookuri ............. G10K 11/17873
　　　　　　　　　　　　　　　　　　　　　　381/71.1
2013/0288606 A1* 10/2013 Kirsch ................ H04M 1/6091
　　　　　　　　　　　　　　　　　　　　　　455/41.3
2016/0095142 A1　　3/2016 Chu

FOREIGN PATENT DOCUMENTS

WO　　WO 2008/061205 A2　　5/2008
WO　　WO 2012/164272 A2　　12/2012

OTHER PUBLICATIONS

International Preliminary Report on Patentability directed to related International Patent Application No. PCT/EP2019/055258, completed Apr. 9, 2020, with attached English-language translation; 11 pages.

* cited by examiner

MAIN UNIT, SYSTEM AND METHOD FOR AN INFOTAINMENT SYSTEM OF A VEHICLE

TECHNICAL FIELD

The present disclosure relates to a head unit for an infotainment system of a vehicle, which can be coupled to a mobile terminal device via a Bluetooth link. The present disclosure also relates to a system having a mobile terminal device and a head unit of an infotainment system of a vehicle and a method for exchanging a digital audio signal between a mobile terminal device and a head unit of an infotainment system of a vehicle.

BACKGROUND

An infotainment system of a vehicle usually comprises a head unit having a plurality of function modules such as a radio, a CD player, a navigation system, and the like, one or more microphones and speakers connected to the head unit, and one or more interfaces for wired or wireless linking of the head unit with external devices, for example a mobile terminal device.

US 2016/0095142 A1, for example, discloses a method for transmitting data between two electronic devices, in which the data are transmitted between the electronic devices in a priority-controlled manner via two simultaneously existing wireless links between the two electronic devices.

Function modules of the infotainment system, which process acoustic analog audio signals such as spoken utterances by vehicle occupants and/or digital audio signals, i.e., audio data such as music data from a CD, are mostly implemented by means of specialized, highly integrated circuits in the scope of increasing efforts towards miniaturization.

Such an integrated circuit for processing audio signals, a communication device comprising such an integrated circuit, and a control method for such an integrated circuit are disclosed in WO 2012/64272 A2. With the integrated circuit, different analog or digital audio signals arriving at a plurality of signal inputs can be further processed in a variety of ways to form different analog or digital audio signals and output to a plurality of signal outputs.

While a vehicle is in motion, generally unfavorable acoustic conditions prevail in an interior of the vehicle as a result of driving noises, which can hinder a conversation between occupants of the vehicle or make it practically impossible. The driving noises can depend on a type and/or a driving speed of the vehicle, on weather conditions, on further vehicles in the surroundings of the vehicle, or on other background noise.

In particular, conversations between an occupant seated in a front seat of the vehicle and an occupant seated in a rear seat of the vehicle are made difficult by the fact that the occupant in the front seat usually directs his face forward and away from the occupant in the rear seat, so that the latter can only indirectly understand acoustic utterances of the former.

To remedy this, WO 2008/061205 A1 discloses an integrated communication system for a motor vehicle which comprises a control module as well as microphones and speakers connected to the control module and ensures improved acoustic communication, in particular between vehicle occupants seated in the front, on the one hand, and vehicle occupants seated in the rear, on the other hand, even under difficult acoustic conditions. This is mainly achieved by an increased output volume of the speakers in the rear region of the vehicle interior compared to the front region of the interior of the vehicle.

The control module of the communication system described above could easily be integrated into a head unit of an infotainment system of a vehicle. Another function, which is usually provided by a head unit of a modern infotainment system, is hands-free talking during a phone call. Such hands-free talking is prescribed in particular for a driver of the vehicle who, according to applicable regulations, is not allowed to hold a mobile phone in his hand while driving the vehicle. Of course, hands-free functionality is also impaired by the aforementioned unfavorable acoustic conditions. These can superimpose acoustic utterances of the vehicle occupant for another participant in the phone call and sometimes make them incomprehensible.

DE 11 2010 005 020 T5 discloses a device and a method for voice signal restoration. In this case, a synthesis filter of the device synthesizes a plurality of broadband voice signals by combining broadband phoneme signals and sound source signals from a voice signal codebook. One of the synthesized broadband voice signals is selected by means of a distortion evaluation unit which has the lowest distortion compared to a sampled narrowband voice signal.

In most cases, a mobile terminal device suitable for making phone calls is coupled to the head unit of the infotainment system via a Bluetooth link. A plurality of communication profiles intended for different purposes are assigned to the Bluetooth standard. A so-called hands-free profile (HFP) is usually used to couple a mobile terminal device, but this only reserves a specific, relatively small maximum bandwidth for transmitting an audio signal in real time. Accordingly, a digital audio signal with a maximum sampling frequency of only 16 kHz can be transmitted within the scope of the HFP, whereby a frequency spectrum of a transmitted analog acoustic voice signal is limited to 8 kHz according to the so-called anti-aliasing theorem. This leads to a reduced audio quality of the digital audio signal transmitted via the Bluetooth link.

BRIEF DESCRIPTION OF DRAWINGS/FIGURES

DETAILED DESCRIPTION

Figure 1:
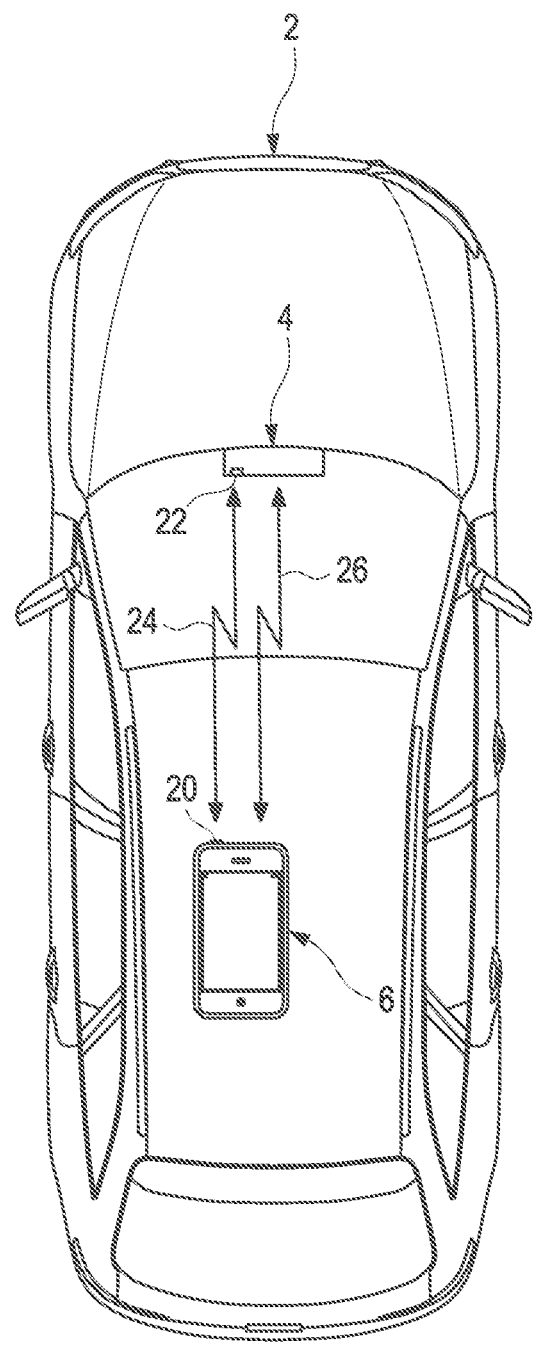
FIG. 1 is a schematic representation of an embodiment of a system according to an embodiment with a mobile terminal device of a head unit of an infotainment system of a vehicle, as described herein.

The present disclosure is, therefore, based on the object of providing an improved head unit of an infotainment system of a vehicle, which avoids the disadvantages described above and ensures better audio quality for hands-free talking with a mobile terminal device coupled via a Bluetooth link. In addition, it is an object of the present disclosure to create an improved system having a mobile terminal device and a head unit of an infotainment system of a vehicle and to indicate an improved method for exchanging a digital audio signal between a mobile terminal device and a head unit of an infotainment system of a vehicle.

In some embodiments, invention is a head unit for an infotainment system of a vehicle is disclosed. The head unit may be coupled to a mobile terminal device via a Bluetooth link. Such head units are installed in a plurality of modern vehicles, which results in many possible uses as described in the present disclosure.

In some embodiments, the head unit may be configured to exchange a digital audio signal with a mobile terminal device coupled via the Bluetooth link via a further wireless link. The further wireless link frees the digital audio signal from the bandwidth restriction of the Bluetooth standard HFP and thus enables improved audio quality for hands-free talking. A person skilled in the art will understand that the HFP will continue to be used for controlling the head unit and the mobile terminal device coupled to it.

In some embodiments, the head unit has a radio module for the further wireless link, in particular a WLAN module for a WiFi link, and/or an internal mobile radio module for a mobile radio link. Both the WLAN module and the internal mobile radio module provide a bandwidth that allows exchanging a digital audio signal with a sampling frequency higher than 16 kHz in real time. If the radio module is formed as a WLAN module, the head unit can establish a wireless link with a stationary WLAN hotspot outside the vehicle.

In some embodiments, the head unit has an amplifier module for amplifying the audio signal, an audio signal processing module for processing the audio signal, and an audio control module for controlling the audio signal processing module. The audio processing module can comprise a plurality of audio codecs (speech coders/decoders), which transform an acoustic voice signal into a digital audio signal by means of different algorithms and vice versa and in this way offer different audio qualities of the digital audio signal assigned to the analog acoustic voice signal. The audio control module can be provided as an app installed in the head unit and, depending on a bandwidth available for exchanging the audio signal, devices involved in the phone call, etc., determine the appropriate audio codec and the optimal sampling frequency for processing the digital audio signal. The determination of the suitable audio codec and the optimal sampling frequency can also be based on negotiation with the devices involved, in particular the device on the other side. In addition, the behavior of the effective algorithms can be optimally coordinated.

In some embodiments, the head unit is configured to exchange an audio signal with a sampling frequency which is higher than 16 kHz and in particular is at least 44 kHz. With the Bluetooth HFP, the bandwidth available for transmitting a digital audio signal only allows a sampling frequency of 16 kHz. The further wireless link and the internal mobile radio link, on the other hand, provide a bandwidth for an audio signal which allows a sampling frequency of over 16 kHz, in particular CD quality with a sampling frequency of 44 kHz or more (full band).

In some embodiments, a system having a mobile terminal device and a head unit of an infotainment system of a vehicle, in particular a head unit according to various embodiments, as described herein, which can be coupled via a Bluetooth link and which is configured to exchange a digital audio signal between the mobile terminal device and the head unit.

In some embodiments, the system is configured to exchange a digital audio signal between the mobile terminal device and the head unit via a further wireless link when they are coupled via the Bluetooth link. This frees the exchange of the audio signal from the bandwidth restriction of the HFP.

In some embodiments, the system is configured to exchange the audio signal between the mobile terminal device and the head unit via a WiFi link. A WiFi link provides a bandwidth that allows an audio signal to be exchanged with a higher sampling frequency than the HFP.

In some embodiments, the system is configured to exchange an audio signal with a sampling frequency which is higher than 16 kHz and in particular is at least 44 kHz. As a result of the further wireless link, audio quality with a sampling frequency of 44 kHz (CD standard) or above (full band) can be achieved.

In some embodiments, the mobile terminal device is a mobile phone, in particular a smartphone, or a tablet. The mobile terminal device can include an app which, in the event of a Bluetooth coupling with the head unit, redirects the digital audio signal via the further wireless link.

In some embodiments, a method for exchanging a digital audio signal between a mobile terminal device, in particular a mobile phone, a smartphone or a tablet, and a head unit of an infotainment system of a vehicle, in particular a head unit according to various embodiments, as described herein, in which the mobile terminal device and the head unit are or become coupled via a Bluetooth link, is disclosed.

In some embodiments, in the method, the audio signal is exchanged via a further wireless link, in particular via a WiFi link between the mobile terminal device and the head unit. The further wireless link provides a greater bandwidth than the HFP for the exchange of the audio signal.

In some embodiments, an audio signal is exchanged with a sampling frequency which is higher than 16 kHz and in particular is at least 44 kHz. A sampling frequency of 44 kHz corresponds to the CD standard. However, sampling frequencies above this (full band) can also be transmitted via the further wireless link.

FIG. 1 shows a schematic representation of an embodiment of a system according to an embodiment with a mobile terminal device 6 and a head unit 4 of an infotainment system of a vehicle 2, which provides a hands-free function to an occupant of the vehicle. The mobile terminal device 6 and the head unit 4 can each be coupled via a Bluetooth link 24.

The system is configured to exchange a digital audio signal between the mobile terminal device 6 and the head unit 4 via a further wireless link 26 when they are coupled via the Bluetooth link 24. In particular, the system is configured to exchange the audio signal between the mobile terminal device 6 and the head unit 4 via a WiFi link that exists in addition to the Bluetooth link 24.

Furthermore, the system is configured to exchange an audio signal with a sampling frequency which is higher than 16 kHz and in particular is at least 44 kHz via the further wireless link 26.

Figure 2:
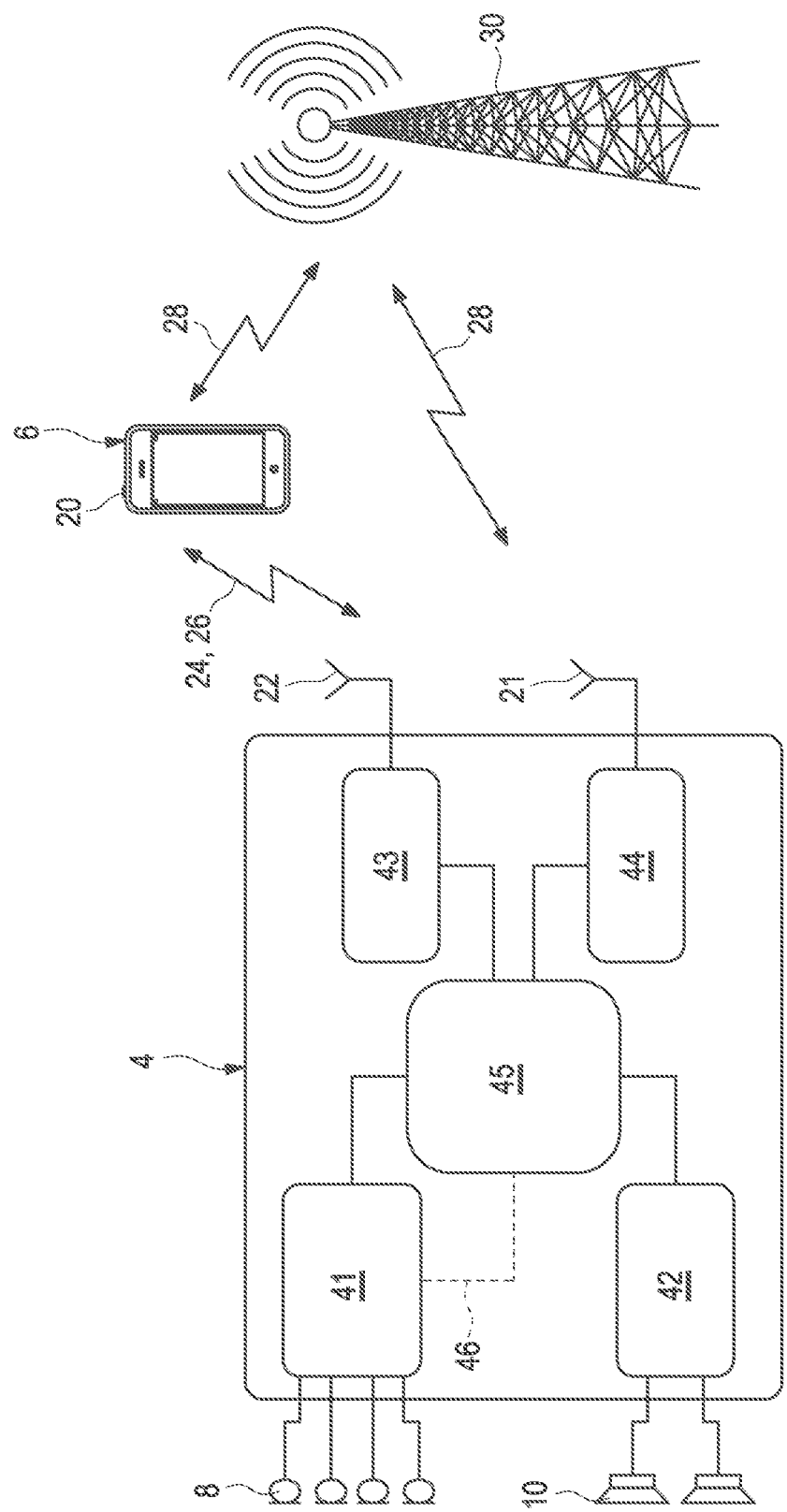
FIG. 2 is schematic detailed representation of the head unit shown in FIG. 1 with further links, according to some embodiments.

FIG. 2 is a schematic detailed representation of the head unit 4 shown in FIG. 1 with further wireless links. The head unit 4 comprises an amplifier module 42 for amplifying the digital audio signal and an audio signal processing module 41 for processing the audio signal.

In order to create the hands-free function, four microphones 8 are connected to the audio processing module 41 and two speakers 10 are connected to the amplifier module 42. Of course, different numbers of microphones 8 and/or speakers 10 can also be connected to the head unit 4.

The audio signal processing module 41 comprises one or more so-called audio codecs (speech coders/decoders) which transform an acoustic voice signal detected by the microphones 8 into a digital audio signal and vice versa. The audio codecs differ on the basis of the algorithms carried out for the transformation as well as the sampling frequencies that can be used and are used by the algorithms.

The head unit 4 comprises an antenna 22 and a Bluetooth module (not shown) that is connected to the antenna 22 and by means of which the head unit 4 can be coupled to the mobile terminal device 6. The head unit 4 also comprises a radio module 43, which is designed as a WLAN module for a WiFi link as the further wireless link and is also connected to the antenna 22. As a further interface for wireless communication, the head unit 4 comprises an internal mobile radio module 44 for a mobile radio link 28 to a stationary mobile radio base station 30.

The head unit 4 further comprises an audio control module 45 for controlling the audio signal processing module 41 by determining a suitable audio codec and an optimal sampling frequency, by means of which the acoustic voice signal is transformed into a digital audio signal and vice versa, and setting the wireless link 26, 28 via which the audio signal is exchanged. For this purpose, the audio control module 45 has interfaces to the audio signal processing module 41, the amplifier module 42, the radio module 43, and the internal mobile radio module 44, and is connected to these via the respective interface. The interface to the audio signal processing module 41 can comprise a separate control line 46. The audio control module 45 can for example be provided as an app and can be installed in the head unit 4.

The head unit 4 is configured to exchange a digital audio signal with the mobile terminal device 6 coupled via a Bluetooth link 24 via the further wireless link 26, which can exist in addition to the Bluetooth link 24, and to exchange an audio signal with a sampling frequency which is higher than 16 kHz and in particular is at least 44 kHz with the mobile terminal device 6. Alternatively, the head unit 4 can also exchange the digital audio signal via the internal mobile radio module 44 and the mobile radio link 28 provided by this mobile radio module. If the vehicle 2 is located within the range of a stationary WLAN hotspot, the head unit 4 can exchange the digital audio signal via a wireless link between the radio module 43 and the WLAN hotspot instead of the mobile radio link 28.

The mobile terminal device 6 is a smartphone that can be coupled via a Bluetooth link 24 and connected via a further wireless link 26, in particular a WiFi link, but it can also be another smartphone that can be coupled via the Bluetooth link 24 and a mobile phone or tablet that can be connected via the further wireless link 26. As usual, the mobile terminal device 6 is configured to exchange data, in particular a digital audio signal, with a stationary mobile radio base station 30 via a mobile radio link 28.

During the operation of the system, the mobile terminal device 6 and the head unit 4 are coupled to one another via a Bluetooth link 24, which is only used for control purposes, and are connected to one another via a further wireless link 26, in particular a WiFi link. The audio control module 45 determines, for each phone call, a suitable audio codec of the audio signal processing module 41, a maximum bandwidth of the audio signal transmission and the optimal sampling frequency, depending on and in coordination with the devices involved. The digital audio signal transformed by the audio signal processing module 41 is exchanged at a sampling frequency, which is higher than 16 kHz and in particular is at least 44 kHz, between the mobile terminal device 6 and the head unit 4 of the infotainment system of the vehicle 2 via the further wireless link 26.

One advantage of the head unit according to various embodiments, as described herein, is that the audio quality is improved during the phone call by means of the hands-free device of the vehicle. Another advantage can be seen in the fact that the head unit according to various embodiments, as described herein, always sets an optimal audio quality of the hands-free device for each phone call, depending on a plurality of factors. The system according to various embodiments, as described herein, allows for an end-to-end data link in which the respective technical possibilities, for example available bandwidth or available audio codecs, and the respective surroundings situations, for example vehicle type, vehicle speed, or background noise, of all devices involved are known and can be optimally coordinated.

LIST OF REFERENCE SIGNS

2 Vehicle
4 Head unit
6 Mobile terminal device
8 Microphone
10 Speaker
20 Antenna
21 Antenna
22 Antenna
24 Bluetooth link
26 Further wireless link
28 Mobile radio link
30 Mobile radio base station
41 Audio signal processing module
42 Amplifier module
43 Radio module
44 Internal mobile radio module
45 Audio control module
46 Control line

The invention claimed is:

1. A head unit for an infotainment system of a vehicle, wherein the head unit is coupled to a mobile terminal device via a Bluetooth link for control purposes, the head unit being configured to:

in response to hands-free talking during a phone call with the mobile terminal device coupled via the Bluetooth link based on a hands-free profile, exchange, at an audio signal processing module of the vehicle, a digital audio signal adapted for improved audio quality during the hands-free talking, via an additional wireless link, and based on the mobile terminal device, surrounding information of the mobile terminal device, a vehicle type, or vehicle speed, selecting, by the audio signal processing module of the vehicle, an audio codec, a maximum value of bandwidth for the phone call, and a sampling frequency of the digital audio signal for the phone call.

2. The head unit of claim 1, further comprising a radio module configured to create the additional wireless link.

3. The head unit of claim 2, wherein the additional wireless link is a WiFi link and the radio module is a wireless local area network (WLAN) module.

4. The head unit of claim 2, wherein the additional wireless link is a mobile radio link and the radio module is an internal mobile radio module.

5. The head unit of claim 1, further comprising:

an amplifier module configured for amplifying an analog audio signal, the audio signal processing module configured for processing the analog audio signal for converting into the digital audio signal and vice versa; and an audio control module configured for controlling the audio signal processing module.

6. The head unit of claim 1, wherein the digital audio signal has a sampling frequency higher than 16 kilohertz (kHz).

7. The head unit of claim 6, wherein the sampling frequency is at least 44 kHz.

8. A system comprising:
a mobile terminal device; and
a head unit for an infotainment system of a vehicle, wherein the head unit is configured to:
in response to hands-free talking during a phone call with the mobile terminal device coupled via a Bluetooth link for control purposes based on a hands-free profile, exchange, at an audio signal processing module of the vehicle, a digital audio signal adapted for improved audio quality during the hands-free talking, via an additional wireless link, and
based on the mobile terminal device, surrounding information of the mobile terminal device, a vehicle type, or vehicle speed, select, by the audio signal processing module of the vehicle, an audio codec, a maximum value of bandwidth for the phone call, and a sampling frequency of the digital audio signal for the phone call.

9. The system of claim 8, wherein the digital audio signal has a sampling frequency higher than 16 kilohertz (kHz).

10. The system of claim 9, wherein the sampling frequency is at least 44 kHz.

11. The system of claim 8, wherein the mobile terminal device is a mobile phone.

12. The system of claim 11, wherein the mobile phone is a smartphone or a tablet.

13. A method for exchanging a digital audio signal between a mobile terminal device and a head unit of an infotainment system of a vehicle, the method comprising:
coupling the mobile terminal device and the head unit via a Bluetooth link for control purposes based on a hands-free profile;
exchanging, at an audio signal processing module of the vehicle, a digital audio signal adapted for improved audio quality during hands-free talking via an additional wireless link in response to the hands-free talking during a phone call with the mobile terminal device using the Bluetooth link, and
based on the mobile terminal device, surrounding information of the mobile terminal device, a vehicle type, or vehicle speed, selecting, by the audio signal processing module of the vehicle, an audio codec, a maximum value of bandwidth for the phone call, and a sampling frequency of the digital audio signal for the phone call.

14. The method of claim 13, further comprising creating the additional wireless link as a WiFi link using a wireless local area network (WLAN) module.

15. The method of claim 13, further comprising creating the additional wireless link as a mobile radio link using an internal mobile radio module.

16. The method of claim 13, wherein the digital audio signal has a sampling frequency higher than 16 kilohertz (kHz).

17. The method of claim 16, wherein the sampling frequency is at least 44 kHz.

\* \* \* \* \*